(12) United States Patent
Harder et al.

(10) Patent No.: US 9,815,967 B2
(45) Date of Patent: Nov. 14, 2017

(54) LONG-FIBRE-REINFORCED POLYAMIDES

(71) Applicant: EMS-PATENT AG, Domat/Ems (CH)

(72) Inventors: Philipp Harder, Chur (CH); Mark Pfleghar, Domat/Ems (CH)

(73) Assignee: EMS-PATENT AG, Domat/Ems (CH)

( * ) Notice: Subject to any disclaimer, the term of this patent is extended or adjusted under 35 U.S.C. 154(b) by 0 days.

(21) Appl. No.: 15/105,011

(22) PCT Filed: Dec. 20, 2013

(86) PCT No.: PCT/EP2013/077634
§ 371 (c)(1),
(2) Date: Sep. 6, 2016

(87) PCT Pub. No.: WO2015/090435
PCT Pub. Date: Jun. 25, 2015

(65) Prior Publication Data
US 2016/0376423 A1    Dec. 29, 2016

(51) Int. Cl.
| | | |
|---|---|---|
| C08L 77/00 | (2006.01) | |
| C08K 7/14 | (2006.01) | |
| C08K 7/06 | (2006.01) | |
| C08L 77/06 | (2006.01) | |
| C08K 3/00 | (2006.01) | |
| C08K 5/00 | (2006.01) | |
| B29C 70/52 | (2006.01) | |

(52) U.S. Cl.
CPC .............. *C08K 7/14* (2013.01); *C08K 3/0041* (2013.01); *C08K 5/005* (2013.01); *C08K 7/06* (2013.01); *C08L 77/06* (2013.01); *B29C 70/52* (2013.01)

(58) Field of Classification Search
None
See application file for complete search history.

(56) References Cited

U.S. PATENT DOCUMENTS

| 8,183,318 B2 | 5/2012 | Stoppelmann |
| 8,309,643 B2 | 11/2012 | Thullen et al. |
| 8,586,662 B2 | 11/2013 | Harder et al. |
| 2008/0021143 A1 | 1/2008 | Thullen et al. |
| 2010/0237271 A1 | 9/2010 | Stoppelmann |
| 2010/0279111 A1 | 11/2010 | Harder et al. |
| 2010/0297373 A1 | 11/2010 | Thullen et al. |
| 2014/0179849 A1* | 6/2014 | Aepli ................ C08G 69/14 524/420 |

FOREIGN PATENT DOCUMENTS

| EP | 0 725 114 B1 | 10/1999 |
| EP | 1 882 719 A1 | 1/2008 |
| EP | 2 060 607 A1 | 5/2009 |
| EP | 2 169 008 A1 | 3/2010 |
| WO | WO 2009/055947 A1 | 5/2009 |
| WO | WO 2011/134930 A1 | 11/2011 |

OTHER PUBLICATIONS

European Patent Office, International Search Report in International Application No. PCT/EP2014/077634 (dated Aug. 6, 2014).
European Patent Office, Written Opinion in International Application No. PCT/EP2014/077634 (dated Aug. 6, 2014).
International Bureau of WIPO, International Preliminary Report on Patentability in International Application No. PCT/EP2014/077634 (dated Jun. 21, 2016).
"ASTM D 1003-11 Standard Test Method for Haze and Luminous Transmittance of Transparent Plastics," ASTM Designation, ASTM International, US, vol. ASTM D 1003-11, pp. 223-229 (2011), XP009179395.

* cited by examiner

*Primary Examiner* — Ana Woodward
(74) *Attorney, Agent, or Firm* — Leydig, Voit & Mayer, Ltd.

(57) ABSTRACT

Disclosed is a polyamide moulding compound suitable for producing moulded articles with improved mechanical properties, the moulding compound including A) at least one amorphous or microcrystalline polyamide, with the proviso that a test piece of polyamide A) has a light transmission according to ASTM D 1003 of at least 80% and a melting heat according to ISO 11357 of <25 J/g, B) 20 to 85% by weight of a long fibre with a round cross-section and C) 0 to 10% by weight of at least one additive, components A) to C) adding up to 100% by weight. Also disclosed is a process for producing moulded bar granulates containing the moulding compound.

12 Claims, No Drawings

LONG-FIBRE-REINFORCED POLYAMIDES

CROSS-REFERENCE TO RELATED APPLICATIONS

This patent application is the U.S. national phase of International Application No. PCT/EP2013/077634, filed on Dec. 20, 2013, the disclosure of which is incorporated herein by reference in its entirety for all purposes.

The present invention relates to polyamide moulding compounds reinforced with long fibres and based on amorphous or microcrystalline polyamides. With the invention, moulded articles made of polyamide moulding compounds can be produced for the first time, which, with respect to their mechanical properties, such as tensile strength, impact properties and distortion, are clearly superior to the polyamide moulding compounds of the state of the art with short fibres. Furthermore, the invention relates to long-fibre-reinforced bar granulates and also to a method for production thereof.

Polyamides are widely used nowadays as structural elements for inside and outside, which can essentially be attributed to the excellent mechanical properties. An improvement in the mechanical properties, such as strength and rigidity, can be achieved in particular by the use of fibrous reinforcing materials, e.g. glass fibres.

Thus EP 2 060 607 A1 describes a polyamide moulding compound which consists of a partially crystalline and amorphous polyamide and in which flat long-glass fibres, i.e. long glass fibres with a non-round cross-section, are incorporated as filling material. The polyamide mixture according to EP 2 060 607 A1 consists, with respect to the polyamide matrix, of 55 to 85% by weight of at least one aliphatic polyamide. The mechanical properties with respect to distortion are however unsatisfactory.

Furthermore, a polyamide mixture is known from EP 0 725 114 B1, in which likewise long-fibre reinforcing materials are contained in the polyamide mixture, however the polyamide moulding compound consists respectively of crystalline, thermoplastic polyamides and amorphous, thermoplastic polyamides which are incompatible with each other, i.e. two phases are produced here.

Starting herefrom, it was therefore the object of the present invention to provide a polyamide moulding compound which, in addition to excellent mechanical properties, such as improved tensile strength and impact properties, at the same time has very low distortion.

The object is achieved by a polyamide moulding compound according to patent claim 1. The dependent claims represent advantageous embodiments.

The polyamide moulding compound according to the invention is hence distinguished by the polyamide being at least an amorphous or microcrystalline polyamide, with the proviso that polyamide A has a light transmission of a test piece according to ASTM D 1003 of at least 80% and comprises, in such a polyamide moulding compound, 20 to 85% by weight of long fibres with a round cross-section and also possibly additives. The provisos contained in claim 1 with respect to the light transmission apply only for moulding compounds without long fibres.

It has now been shown that such a polyamide moulding compound can be processed to form moulded articles which have excellent properties. This is revealed in the combination of very good tearing resistance, impact—and notch impact strengths with very low distortion. The distortion is determined as the difference in processing shrinkage transversely and longitudinally.

It is essential, in the case of the moulding compound according to the invention that the previously mentioned conditions for the light transmission are maintained for polyamides A.

In the case of the amorphous or microcrystalline polyamides, with respect to the melting heat, those are particularly preferred which have a melting heat of at most 25 J/g, preferably at most 12 J/g, particularly preferably of at most 3 J/g and very particularly preferably of at most 1 J/g. Also this proviso relates only to the polyamides without fibres.

Furthermore, polyamides A display a light transmission, measured according to ASTM D 1003, on test pieces of 2 mm thickness, of at least 80% and hence high transparency. Preferably, polyamides A are used, the test pieces of which achieve a light transmission of at least 85%, particularly preferably of at least 88% and also very particularly preferably of at least 90%.

In the case where microcrystalline polyamides are used, this hereby concerns a morphology in which the crystallites have such a small dimension that transparency, as described above, is still achieved.

In the case of the invention, it is possible furthermore that a certain proportion, and in fact up to 27% by weight of the amorphous or microcrystalline polyamide, is replaced by an aliphatic polyamide. It is hereby essential that the conditions mentioned in claim 3 relating to the weight ratio of the two polyamides and the light transmission of the compound thereof are maintained. For this embodiment, it is hence essential that the upper limit of 27% by weight is maintained, since otherwise disadvantageous properties with respect to the transparency of the compound thereof result. It is preferable in this embodiment that at most up to 27% by weight of polyamide A, relative to the total moulding compound, is replaced by an aliphatic polyamide A1, the essential precondition being required here that polyamides A and A 1 are compatible so that the light transmission of a compound of polyamides A and A 1 is at least 80%. The conditions according to claim 3 apply only for the polyamide moulding compounds without long fibres. Furthermore, it is thereby preferred if the weight ratio of polyamide A to polyamides A1 is 9:1 up to 2:1, preferably 6:1 to 3:1, particularly preferably 5:1 to 3.5:1.

It has proved in addition to be favourable if the relative viscosity of polyamides A or A 1 is 1.35 to 2.15, preferably 1.40 to 1.80, particularly preferably 1.45 to 1.60, measured in 0.5 g in 100 ml m-cresol at 20° C.

Furthermore, it is advantageous if at least one of the polyamides A or A1 is amine-terminated. Amine-terminated thereby means that the polyamide has more amino end groups than carboxyl end groups. This can be effected by controlling the polycondensation of the polyamide, in a manner known to the person skilled in the art, with bifunctional or monofunctional amines or carboxylic acids.

With respect to the composition, relating to quantities, of the polyamide moulding compound according to the invention, it is preferred if the long fibres are contained with a weight proportion of 25 to 80% by weight, preferably of 30 to 70% by weight, particularly preferably of 35 to 65% by weight, relative to the total polyamide moulding compound. The additives (feature C) can be contained, preferably with a weight proportion of 0.01 to 10% by weight, preferably with a weight proportion of 0.1 to 5%, relative to the total polyamide moulding compound. The weight proportion of each individual additive is thereby at most 4% by weight.

From a material point of view, it is preferred if the long fibre with a round cross-section is a glass fibre or a carbon fibre.

The at least one amorphous or microcrystalline polyamide A is preferably selected from PA MACM12/PACM12, PA PACM12, PA MACMI/ 12, PA NDT/INDT, PA MACM14, PA MACMI/ MACMT/12, PA 6I/6T/MACMI/MACMT/ 12, PA 6I/6T/MACMI/MACMT, PA MACMI/MACMT/ MACM12, PA MACMI/MACM12 and mixtures hereof.

Preferably, the group consists of PA MACM12, PA MACM12/PACM12, PA MACMI/12, PA NDT/INDT, PA MACM14, PA MACMI/MACMT/12, PA 6I/6T/MACMI/ MACMT/12, PA MACMI/MACMT/MACM 12, PA MACMI/MACM12 and mixtures hereof. For particular preference, the group consists of PA MACM12, PA MACM12/PACM12, PA MACMI/12, PA MACMI/ MACMT/12, PA 6I/6T/MACMI/MACMT/12, PA MACMI/ MACMT/MACM12 and mixtures hereof.

The proportion of PACM 12 in PA MACM12/PACM12 is preferably at most 50% by mol. PA MACM12/PACM12 with at most 50% by mol of PACM12 are amorphous and hence do not display a melting point.

In the case of the microcrystalline polyamides, the melting point, measured according to ISO 11537, is at most 252° C. Amorphous polyamides do not display a melting point because of their amorphous property. The aliphatic polyamide A1, measured according to ISO 11537, has a melting point of at most 252° C.

The aliphatic polyamides A1 are preferably selected from PA 11, PA 12, PA 1010, PA 1212, PA 1012, PA 1210, PA 69, PA 610, PA 612, PA 6/12 and mixtures or copolyamides hereof. For particular preference, the aliphatic polyamides A1 are selected from PA 12, PA 1010 and mixtures hereof.

The spellings and abbreviations used for polyamides and the monomers thereof correspond to the ISO standard 1874-1:1992. The spelling PA NDT/INDT for example stands for a polyamide formed from 2,2,4-trimethylhexamethylene diamine, 2,4,4-trimethylhexamethylene diamine and terephthalic acid.

The glass—or carbon fibres used during the pultrusion process as endless fibres (roving) can be equipped with a suitable sizing—or adhesive system. For this purpose, for example systems based on silanes, titanates, polyamides, urethanes, polyhydroxy ethers, epoxides, nickel, respectively combinations or mixtures thereof can be used.

The long glass fibres have a diameter of 10 to 20 μm, preferably of 10 to 18 μm, particularly preferably of 10 to 14 μm, very particularly preferably of 10 to 12 μm. Thinner fibres thereby lead to higher toughness. In the case of diameters below 10 μm, the strength of the fibre required for the pultrusion process is however no longer provided.

The long glass fibres can consist of all sorts of glass, such as e.g. A-, C-, D-, E-, M-, S-, R-glass, or any mixtures. Glass fibres made of E-glass or glass fibres made of mixtures with E-glass or mixtures with E-glass fibres are preferred.

The long carbon fibres have a diameter of 3 to 12 μm, preferably 4 to 10 μm, particularly preferably 5 to 9 μm.

In the case of the additives, all additives known per se from the state of the art can be used. Examples of these are additives which are selected from inorganic stabilisers, organic stabilisers, lubricants, colourant—and marking materials, inorganic pigments, organic pigments, IR absorbers, antistatic agents, anti-blocking means, crystallisation retardants, condensation catalysts, chain regulators, defoamers, chain-lengthening additives, graphite, carbon nanotubes, mould-release agents, separating means, optical brighteners, photochromic additives, plasticising agents, metallic pigments, metal flakes, metal-coated particles, filling—and reinforcing materials, in particular nanoscale filling—and reinforcing materials, such as e.g. minerals with a particle size of at most 100 nm or unmodified or modified, natural or synthetic phyllosilicates or mixtures thereof. As stabilisers or age-protecting means, e.g. antioxidants, antiozonants, light-protection means, UV stabilisers, UV absorbers or UV blockers, can be used in the polyamide moulding compounds according to the invention.

In the case of the polyamide moulding compound according to the invention, it is also not necessary that a flame retardant has to be used. According to the invention, an embodiment of the invention hence comprises a polyamide moulding compound as described above, however without any flame-retardant.

According to the invention, a further embodiment of the invention comprises a polyamide moulding compound as described above, however without carbon black.

The production of the polyamides and also of the amorphous or microcrystalline polyamides and also of the aliphatic polyamides is effected, as known per se in the state of the art, by using essentially molar quantities of the corresponding diamines and dicarboxylic acids and possibly lactams and/or aminocarboxylic acids.

The polyamide moulding compounds according to the invention can be produced by the known methods for the production of long-fibre-reinforced bar granulate, in particular by pultrusion processes, in which the endless fibre strand is completely saturated with the polymer melt and subsequently cooled and cut. The long-fibre-reinforced bar granulate obtained in this way, which preferably has a granulate length of 3 to 25 mm, in particular of 4 to 12 mm, can be processed further by the normal processing methods (such as e.g. injection moulding, pressing) to form moulded parts, particularly good properties of the moulded part being achieved with gentle processing methods. In this context, "gentle" implies above all that an excessive fibre breakage and the hence accompanying great reduction in fibre length is extensively avoided. In the case of injection moulding, this means that shafts with a large diameter should be used.

Subsequently, the invention is described in more detail with reference to embodiments.

The test pieces used in the tests were produced on an injection moulding machine of the company Arburg, Modell Allrounder 420 C 1000-250. Increasing cylinder temperatures of 230° C. to at most 295° C. were thereby used. The mould temperature was 80° C.—apart from in the case of the plates for the processing shrinkage which were produced with a mould temperature of 90° C. In the case of the round plates for measurement of the light transmission, mirror-finish moulds were used.

In the subsequent tables 1 and 2, the starting materials used and also the exact chemical nomenclature thereof and the manufacturer are listed.

TABLE 1

| Components | Description | Producer |
|---|---|---|
| PA MACM12 | amorphous polyamide MACM12 made of bis(3-methyl-4-amino-cyclohexyl)methane and dodecanedioic acid RV* 1.52 (measured with 0.5 g in 100 ml m-cresol at 20° C.) glass transition temperature 155° C. | EMS-CHEMIE AG Switzerland |
| PA MACMI/12 | amorphous polyamide MACMI/12 in the molar ratio 65/35 made of bis(3-methyl-4-amino-cyclohexyl)methane, isophthalic acid and laurinlactam RV* 1.53 (measured with 0.5 g in 100 ml m-cresol at 20° C.) glass transition temperature 160° C. | EMS-CHEMIE AG, Switzerland |
| PA MACMI/MACMT/MACM12 | amorphous polyamide MACMI/MACMT/MACM12 in the molar ratio 27/27/46 made of bis(3-methyl-4-amino-cyclohexyl)methane, isophthalic acid, terephthalic acid and dodecanedioic acid RV* 1.54 (measured with 0.5 g in 100 ml m-cresol at 20° C.) glass transition temperature 200° C. | EMS-CHEMIE AG, Switzerland |
| PA 12 | polyamide 12 made of laurinlactam RV* 1.58 (measured with 0.5 g in 100 ml m-cresol at 20° C.) melting point 178° C. | EMS-CHEMIE AG, Switzerland |
| PA 1010 | polyamide 1010 made of decane-1,6-diamine and 1,10-decanedioic acid RV* 1.54 (measured with 0.5 g in 100 ml m-cresol at 20° C.) melting point 200° C. | EMS-CHEMIE AG, Switzerland |
| PA 610 | polyamide 610 made of hexamethylene diamine and sebacic acid RV* 1.52 (measured with 0.5 g in 100 ml m-cresol at 20° C.) melting point 221° C. | EMS-CHEMIE AG, Switzerland |
| Glass fibres, endless | Glass fibres, endless (roving) diameter 17 μm | Tufrov 4510 Nitto Boseki Co., LTD., Japan |
| Glass fibres, short | Glass fibres 4.5 mm long, diameter 10 μm | 995 EC10-4.5 Saint-Gobain Vetrotex, France |
| Heat stabiliser | N,N'-hexane-1,6-diylbis[3-(3,5-di-tert-butyl-4-hydroxyphenyl-propionamide | Irganox 1098 BASF, Germany |
| UV stabiliser | phenol, 2-(2H-benzotriazol-2-yl)-4,6-bis(1-methyl-1-1phenylethyl) CAS-No. 70321-86-7 | Tinuvin 234 BASF, Germany |

*RV relative viscosity

TABLE 2

| | | Examples | | | | | | | | | |
|---|---|---|---|---|---|---|---|---|---|---|---|
| | Unit | 1 | 2 | 3 | 4 | 5 | 6 | 7 | 8 | 9 | 10 |
| PA MACM12 | % by wt. | 56 | 40 | 32 | 43 | 38 | 40 | 40 | — | — | 50 |
| PA MACMI/12 | % by wt | — | — | — | — | — | — | — | 40 | — | — |
| PA MACMI/MACMT/MACM12 | % by wt. | — | — | — | — | — | — | — | — | 40 | — |
| PA 12 | % by wt. | 14 | 10 | 8 | 7 | 12 | — | — | 10 | 10 | — |
| PA 1010 | % by wt. | — | — | — | — | — | 10 | — | — | — | — |
| PA 610 | % by wt. | — | — | — | — | — | — | 10 | — | — | — |
| Glass fibres, endless | % by wt. | 30 | 50 | 60 | 50 | 50 | 50 | 50 | 50 | 50 | 50 |
| Heat stabiliser | % by wt. | 0.25 | 0.25 | 0.25 | 0.25 | 0.25 | 0.25 | 0.25 | 0.25 | 0.25 | 0.25 |
| UV stabiliser | % by wt. | 0.15 | 0.15 | 0.15 | 0.15 | 0.15 | 0.15 | 0.15 | 0.15 | 0.15 | 0.15 |
| Modulus of elasticity in tension | MPa | 7,300 | 12,500 | 15,500 | 12,400 | 12,100 | 12,300 | 12,600 | 13,100 | 12,900 | 12,400 |

TABLE 2-continued

|  | Unit | Examples | | | | | | | | | |
|---|---|---|---|---|---|---|---|---|---|---|---|
|  |  | 1 | 2 | 3 | 4 | 5 | 6 | 7 | 8 | 9 | 10 |
| Tearing strength | MPa | 160 | 215 | 238 | 215 | 210 | 200 | 186 | 188 | 182 | 180 |
| Breaking elongation | % | 2.6 | 2.3 | 1.9 | 2.4 | 2.3 | 2.1 | 1.8 | 1.7 | 1.6 | 2.0 |
| Impact strength Charpy 23° C. | kJ/m2 | 69 | 90 | 95 | 79 | 75 | 70 | 62 | 64 | 63 | 70 |
| Notch impact strength Charpy 23° C. | kJ/m2 | 18 | 35 | 37 | 30 | 27 | 24 | 22 | 23 | 22 | 20 |
| Processing shrinkage |  |  |  |  |  |  |  |  |  |  |  |
| longitudinally | % | 0.10 | 0.05 | 0.05 | 0.05 | 0.05 | 0.05 | 0.05 | 0.08 | 0.10 | 0.06 |
| transversely | % | 0.25 | 0.10 | 0.08 | 0.10 | 0.10 | 0.10 | 0.10 | 0.14 | 0.20 | 0.13 |
| Distortion** | % | 0.15 | 0.05 | 0.03 | 0.05 | 0.05 | 0.05 | 0.05 | 0.06 | 0.10 | 0.07 |

In table 3 the examples according to the invention and, in table 4, the comparative examples and the mechanical properties thereof are listed.

As emerges from table 3, the moulded articles according to the invention display, relative to those of the comparative examples, improved mechanical properties. Thus both the impact strength and the notch impact strength are clearly superior to those of the comparative examples. The polyamide moulding compounds according to the invention or the moulded articles produced therefrom are hence distinguished by superior mechanical properties.

The properties indicated in tables 3 and 4 were determined according to the following methods:

The test pieces were used in the dry state, for this purpose they were stored, after the injection moulding, for at least 48 h at room temperature in a dry environment, i.e. over silica gel.

Melting Heat and Melting Point
  ISO 11357
  Granulate

The differential scanning calorimetry (DSC) was implemented at a heating rate of 20 K/min. In the case of the melting point, the temperature is indicated at the peak maximum.

TABLE 3

|  | Unit | Comparative examples | | | | | |
|---|---|---|---|---|---|---|---|
|  |  | 11 | 12 | 13 | 14 | 15 | 16 |
| PA MACM12 | % by wt. | 56 | 40 | 32 | 40 | — | 50 |
| PA MACMI/MACMT/MACM12 | % by wt. | — | — | — | — | 40 | — |
| PA 12 | % by wt. | 14 | 10 | 8 | — | 10 | — |
| PA 1010 | % by wt. | — | — | — | 10 | — | — |
| Glass fibres, short | % by wt. | 30 | 50 | 60 | 50 | 50 | 50 |
| Heat stabiliser | % by wt. | 0.25 | 0.25 | 0.25 | 0.25 | 0.25 | 0.25 |
| UV stabiliser | % by wt. | 0.15 | 0.15 | 0.15 | 0.15 | 0.15 | 0.15 |
| Modulus of elasticity in tension | MPa | 6,640 | 13,400 | 16,150 | 12,900 | 13,500 | 12,800 |
| Tearing strength | MPa | 130 | 177 | 189 | 180 | 176 | 168 |
| Breaking elongation | % | 3.6 | 2.6 | 2.3 | 2.5 | 2.0 | 2.8 |
| Impact strength Charpy 23° C. | kJ/m2 | 64 | 66 | 50 | 60 | 30 | 62 |
| Notch impact strength Charpy 23° C. | kJ/m2 | 12 | 16 | 14 | 14 | 11 | 14 |
| Processing shrinkage |  |  |  |  |  |  |  |
| longitudinally | % | 0.10 | 0.03 | 0.02 | 0.02 | 0.04 | 0.05 |
| transversely | % | 0.30 | 0.22 | 0.18 | 0.23 | 0.27 | 0.25 |
| Distortion** | % | 0.20 | 0.19 | 0.16 | 0.21 | 0.23 | 0.20 |

Light Transmission
 ASTM D 1003
 Plate, thickness 2 mm, 60×60 mm
 Temperature 23° C.
 Measuring device Haze Gard plus of the company Byk Gardner with
 CIE Light type C. The light transmission value is indicated in % of the irradiated quantity of light.
Modulus of Elasticity in Tension
 ISO 527 with a tensile speed of 1 mm/min
 ISO tensile bar, standard: ISO/CD 3167, type A1, 170×20/10×4 mm, Temperature 23° C.
Tearing Strength and Breaking Elongation
 ISO 527 with a tensile speed of 5 mm/min
 ISO tensile bar, standard: ISO/CD 3167, type A1, 170×20/10×4 mm, Temperature 23° C.
Impact Strength According to Charpy
 ISO 179/*eU
 ISO test bar, standard: ISO/CD 3167, type B1, 80×10×4 mm, Temperature 23° C.
 *1=non-instrumented, 2=instrumented
Notch Impact Strength According to Charpy
 ISO 179/*eA
 ISO test bar, standard: ISO/CD 3167, type B1, 80×10×4 mm, Temperature 23° C.
 *1=non-instrumented, 2=instrumented
Processing Shrinkage
 ISO 294-4
 Plate, type D2, 60×60×2 mm (according to standard ISO 294-3)
 Processing shrinkage is determined longitudinally and transversely relative to the flow direction with respect to the mould cavity size. The arithmetic average of the measurements on 5 plates is indicated.

The invention claimed is:

1. A polyamide moulding compound comprising:
 A) at least one amorphous or microcrystalline polyamide, with the proviso that a test piece of polyamide A) has a light transmission according to ASTM D 1003 of at least 80% and a melting heat according to ISO 11357 of <25 J/g,
 B) an endless fibre with a round cross-section and
 C) 0 to 10% by weight of at least one additive,
 components A) to C) adding up to 100% by weight;
 wherein up to 27% by weight of polyamide A), relative to the total moulding compound, is replaced by an aliphatic polyamide A1), polyamides A and A1) being compatible and the weight ratio of polyamide A) to polyamide A1) being 5:1 to 3.5:1, and the light transmission of a test piece of 2 mm thickness of a compound of A) and A1) being at least 80%,
 wherein the at least one amorphous or microcrystalline polyamide A) is PA MACM12 and the aliphatic polyamide A1) is PA12, and
 wherein the endless fibre is present in an amount of 50-60% by weight relative to the total polyamide moulding compound.

2. The polyamide moulding compound according to claim 1, wherein polyamide A) has a melting heat according to ISO 11357 of at most 12 J/g, and a test piece of 2 mm thickness of polyamide A) displays a light transmission according to ASTM D 1003 of at least 80%.

3. The polyamide moulding compound according to claim 1, wherein the relative viscosity of polyamide A) or A1) is 1.35 to 2.15, measured with 0.5 g in 100 ml m-cresol at 20° C.

4. The polyamide moulding compound according to claim 1, wherein at least one of the polyamides A) and A1) is amine-terminated.

5. The polyamide moulding compound according to claim 1, wherein the endless fibre is a glass fibre and/or carbon fibre.

6. The polyamide moulding compound according to claim 1, wherein the at least one additive or additives C) are contained in a weight proportion of 0.01 to 10% by weight, relative to the total polyamide moulding compound.

7. The polyamide moulding compound according to claim 1, wherein the at least one additive is selected from inorganic stabilisers, organic stabilisers, lubricants, colorant and marking materials, inorganic pigments, organic pigments, antistatic agents, crystallisation retardants, condensation catalysts, chain regulators, defoamers, chain-lengthening additives, graphite, carbon nanotubes, mould-release agents, optical brighteners, photochromic additives, plasticising agents, metallic pigments, metal flakes, metal-coated particles, and filling and reinforcing materials.

8. The polyamide moulding compound according to claim 7, wherein the filling and reinforcing materials are nanoscale filling and reinforcing materials, minerals with a particle size of at most 100 nm, or unmodified or modified, natural or synthetic phyllosilicates.

9. The polyamide moulding compound according to claim 1, which does not include any flame-retardant.

10. The polyamide moulding compound according to claim 1, which is an endless fibre-reinforced bar granulate.

11. The polyamide moulding compound according to claim 10, wherein the granulate length is 3 to 25 mm.

12. A method for the production of an endless fibre-reinforced bar granulate comprising subjecting a polyamide moulding compound to a pultrusion process, the polyamide moulding compound comprising:
 A) at least one amorphous or microcrystalline polyamide, with the proviso that a test piece of polyamide A) has a light transmission according to ASTM D 1003 of at least 80% and a melting heat according to ISO 11357 of <25 J/g,
 B) an endless fibre with a round cross-section and
 C) 0 to 10% by weight of at least one additive,
 the components A) to C) adding up to 100% by weight;
 wherein up to 27% by weight of polyamide A), relative to the total moulding compound, is replaced by an aliphatic polyamide A1), polyamides A) and A1) being compatible and the weight ratio of polyamides A) to polyamide A1) being 5:1 to 3.5:1, and the light transmission of a test piece of 2 mm thickness of a compound of A) and A1) being at least 80%;
 wherein the at least one amorphous or microcrystalline polyamide A) is PA MACM12 and the aliphatic polyamide A1) is PA12, and
 wherein the endless fibre is present in an amount of 50-60% by weight relative to the total polyamide moulding compound.

* * * * *